United States Patent [19]
Huffman

[11] 3,909,780
[45] Sept. 30, 1975

[54] LOW-VELOCITY WARNING DEVICE
[76] Inventor: Bobbie Dale Huffman, R.R. 24, Box 163, Terre Haute, Ind. 46602
[22] Filed: Sept. 2, 1969
[21] Appl. No.: 854,410

[52] U.S. Cl. ................ 340/62; 340/266; 180/82 R; 73/488
[51] Int. Cl.² .......................................... B60Q 9/00
[58] Field of Search .............. 340/52, 62, 266, 263; 180/82; 73/488, 494, 511, 514

[56] References Cited
UNITED STATES PATENTS

| | | | |
|---|---|---|---|
| 2,979,628 | 4/1961 | Gaon | 340/266 |
| 3,008,121 | 11/1961 | Ellithorpe | 340/62 |
| 3,129,416 | 4/1964 | Freedman | 340/266 X |
| 3,171,058 | 2/1965 | Ono | 340/62 X |

*Primary Examiner*—John W. Caldwell
*Assistant Examiner*—William M. Wannisky
*Attorney, Agent, or Firm*—Robert H. Dewey

[57] ABSTRACT

A low-velocity warning device and circuit therefor for a vehicle. The device is normally inactivated above a pre-determined velocity but becoming activated during deceleration at a velocity below the pre-determined velocity thereby signaling others of the deceleration. The device comprises a light source, a photoelectric cell responsive thereto, and a velocity-responsive means capable of interrupting light from the light source and one or a multiple of warning lamps. The warning lamps are the turn signal lights normally present on a vehicle and a means is provided whereby activation of the turn signals by the turn-signal lever automatically inactivates the warning device.

2 Claims, 3 Drawing Figures

U.S. Patent   Sept. 30,1975   3,909,780

3,909,780

LOW-VELOCITY WARNING DEVICE

BACKGROUND OF THE INVENTION

This invention relates generally to a low-velocity warning device for a moving vehicle. In a particular aspect, this invention relates to a device responsive to deceleration and to reverse motion and adapted to activating a warning system at a pre-determined velocity variable at will by the operator of the vehicle.

It is well known that one of the major problems in transportation, both on high-speed express highways as well as in congested slow-moving traffic areas, is the so-called "rear-end" collision. Accidents of this nature are occurring at an ever increasing rate and are responsible for a large part of the increase in automobile accidents and personal injuries. A major cause of the "rear-end" collision, which occurs when a decelerating lead vehicle is struck in the rear by a following vehicle, is the failure of the operator of the lead vehicle to properly signal that deceleration is intended or underway, or is due to the failure of the operator of the following vehicle to comprehend the signal, if given. Accordingly a need exists for a means of automatically warning the operator of a following vehicle, or other, of a deceleration in the rate of speed of the lead vehicle.

SUMMARY OF THE INVENTION

It is an object of this invention to provide an automatic low-velocity warning device for a moving vehicle.

It is another object of this invention to provide a deceleration-responsive device and electrical circuit therefor suitable for activating a warning system at a pre-determined velocity of the vehicle during deceleration.

Another object of this invention is to provide a means for manually varying the pre-determined velocity at which the deceleration-responsive device becomes operable.

Still another object of this invention is to provide a warning device which operates while the vehicle is in reverse motion.

Other objects of this invention will be obvious to those skilled in the art from the disclosure herein.

The invention described herein is an automatic warning device for a stopped vehicle or a vehicle in forward or reverse motion at low velocity, and an electrical circuit therefor operating one or more warning signal means when the velocity of the vehicle is less than a selected, or pre-determined velocity. The warning device comprises (a) a warning signal means activated and automatically controlled by (b) a velocity-detecting means responsive to a deceleration in the velocity of the vehicle below a selected velocity, and (c) an adjusting means for selecting the velocity at which the detecting means becomes operable, which adjusting means is variable at will by the operator.

DETAILED DISCUSSION

Figure 1:
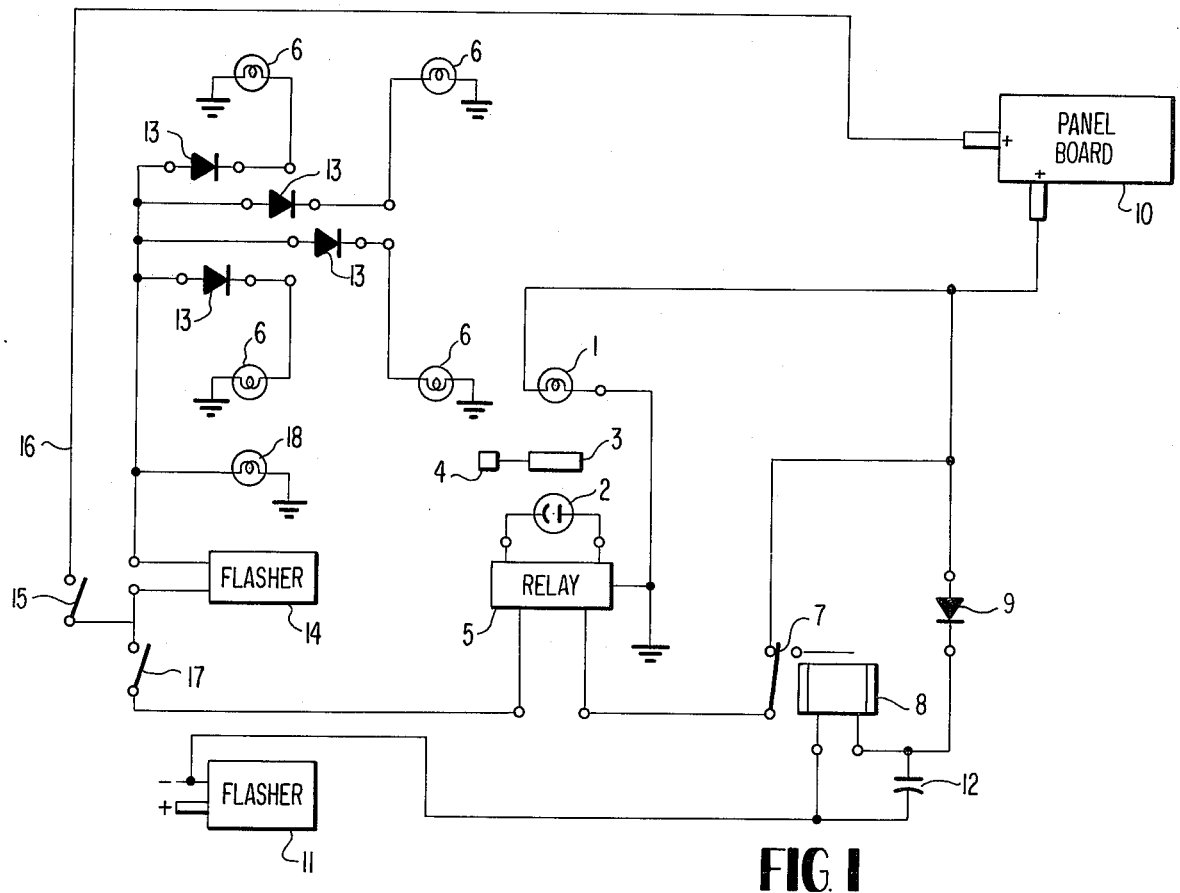
FIG. 1 is a diagrammatic representation of the invention and the electrical circuit therefor.

With reference to FIG. 1, the warning signal means is conveniently, and preferably, provided by a plurality, usually four, of flashing turn signal lamps 6 of the vehicle, if any, or other lamps, sirens or horns can be otherwise provided. Many vehicles are additionally equipped with a four-way flasher 14 with pilot lamp 18 and a manually operated switch therefor 15 to warn of a stopped vehicle. The switch is connected by power lead 16 to the electric power source, conveniently provided by connecting to the vehicle's electrical panelboard 10 preferably, but not necessarily, independent of the vehicle's ignition switch. A diode 13 is placed in each lead from the flasher to the lamp, or a multiple-pole switch operated by the turn signal lever is substituted therefor. Manually operated switch 17 is provided to inactivate the warning device when so desired, e.g. to operate the four-way flasher assembly with the ignition switch off for its usual purpose of warning of a stopped vehicle. When the warning device of the present invention is installed on a vehicle which is not equipped with the afore-described four-way flasher, a suitable four-way flasher is installed, and a diode is placed in each lead between the flasher and the lamp. As set forth in detail below, a circuit is also provided whereby the warning device is automatically inactivated by switch 7 operated by relay 8 when the turn signal switch is placed in "on" position so that the turn signal lamps operate to indicate a turn. When the turn is completed and the turn signal switch has returned to "off" position, the warning device and circuit again become activated and operable.

Figure 2:
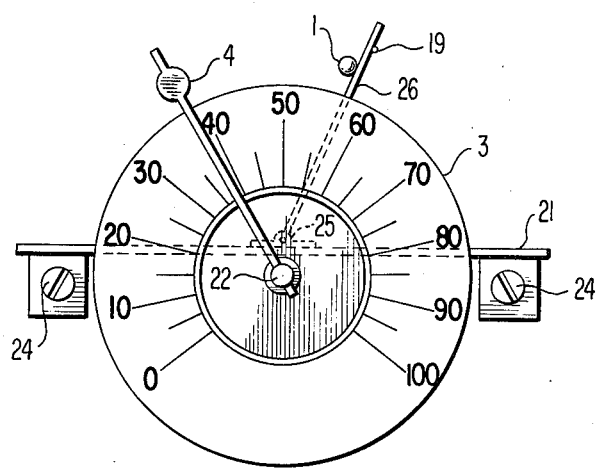
FIG. 2 is a front view of a speedometer modified as described herein.
Figure 3:
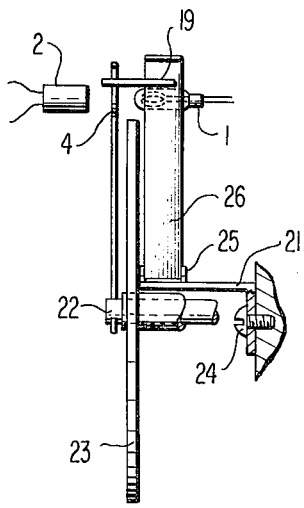
FIG. 3 is a side view thereof.

With reference to FIGS. 2 and 3, the velocity-detecting means of the warning device of the present invention comprises a pivotably-mounted member 26 supporting light source 1 pivotably-mounted by hinge 25 to supporting member 21 attached to a frame (not shown) with bolts 24, a photoelectric cell 2 mounted responsively thereto, a rigidly-mounted first speedometer 3 having a face 23 bearing numerical indicia with a pointer 4 mounted on axle 22, the pointer being adapted to mask the light source 1, thereby interrupting the light to the photoelectric cell, and a pointer-stop 19 mounted on supporting member 26 adapted to interrupt the radial motion of the pointer. The pointer stop 19 is a forwardly extending finger, having a rigid fixed-position with respect to the light source, preferably attached thereto. It is provided to prevent movement of the masking pointer beyond the light source on the high velocity side, thereby preventing reactivation of the photoelectric cell as long as the masking pointer is maintained in front of the light source due to the velocity of the vehicle.

Conveniently, but not necessarily, the light source, the first speedometer, and the photoelectric cell are mounted on a frame, which can be a first plate adapted to support them and adapted to be attached to the vehicle, e.g. to the dashboard of said vehicle. A second plate can be employed parallel to the first plate and suitably spaced therefrom and adapted to support the light source, first speedometer, and photoelectric cell, thereby providing improved stability therefor. Many modes of mounting the aforementioned elements will be apparent to those skilled in the art and it is not intended that the invention be limited thereby.

The first speedometer, having a pointer adapted to mask the light source, is mounted in a fixed position on a plane between the plane of the light source and the plane of the photoelectric cell. The light source is pivotably-mounted behind the speedometer and adjustable along an arc generally concentric with an arc projected by the end of the said pointer. The photoelectric cell is also pivotally-mounted in front of the speedometer and radially with respect to the light source and parallel thereto, and responsive thereto.

The adjusting means for selecting (or predetermining) the velocity is provided by mounting the photoelectric cell and light source pivotably and radially in parallel so that their position with respect to the first speedometer can be varied at will by the operator. Conveniently, the light source and photoelectric cell are mounted on a common axle which is extended sufficiently to be operated by a handle, knob, or pointer. When desired, a scale calibrated in miles per hour can be provided. In another embodiment, the adjusting means can be separately mounted and by means of gears and/or pulleys be employed to rotate the photoelectric cell and light source. The employment of such gears and pulleys is well within the skill of an average artisan. It is understood that the photoelectric cell and light source are mounted positionally stable, as by friction means or other, so as to retain their position after adjustment and will not be easily dislodged by erratic motion of the car as occasioned by rough road beds, etc.

The pointer of the speedometer is adapted to mask the light source when it passes in front thereof responsive to the velocity of the vehicle, thereby interrupting the light entering the photoelectric cell. A suitable pointer is one which is broader in width than the light source, or an opaque mask can be mounted on the pointer in generally the same plane thereof.

Generally the device of the present invention is separate from the speedometer, hereinafter designated the second speedometer, normally supplied with a vehicle, but an emodiment is contemplated whereby the device is modified to employ the normally-supplied, i.e. the second speedometer. In this embodiment, the pointer-stop is eliminated and the mask is adapted to be a continuous opaque band extending generally counterclockwise from the pointer along an arc generally concentric with and coincident to the arc along which the lamp is adjustable, and adapted to and of suitable dimensions to mask the lamp above any selected, pre-determined velocity. In another embodiment the band is provided by an opaque, foldable material anchored at the zero velocity position and movable by the pointer. In either embodiment, the opaque band should be of minimum weight to reduce the "drag" on the pointer to a minimum. Many embodiments for effecting the masking will be apparent to those skilled in the art from the description herein and it is to be understood that the invention is not intended to be limited in any particular masking means.

Customarily, vehicles, especially self-propelled ones, are equipped with a speedometer, i.e. the second speedometer, linked by a cable, i.e. a flexible shaft connection, to the transmission. For the practice of this invention, the conventional flexible shaft is replaced with a conventional drive joint with a double outlet, many of which are known. A suitable model is marketed by the Stewart-Warner Corp., 1826 W. Diversey Parkway, Chicago, Ill. 60614, as Model No. 669. One of the double outlets is connected to the conventional, i.e. the second, speedometer of the vehicle and the other outlet is connected with the first speedometer employed with the device of the present invention.

The first speedometer can be any conventional speedometer responsive to the velocity range through which it is anticipated that the vehicle will be operated. Generally the first speedometer should be responsive to at least 0–60 miles per hour. Many speedometers are equipped with odometers which are unnecessary and irrelevant to the practice of this invention, but are not otherwise objectionable.

The photoelectric cell and light source are preferably mounted to prevent stray light from entering and activating the photoelectric cell. Stray light is any light originating from a source other than provided by the light source of the present invention. One method is to enclose them in a substantially opaque enclosure. The light source of the present invention is selected to provide sufficient luminosity to activate the photoelectric cell. Preferably it is of low-output. It is connected to the ignition system and is lighted whenever the ignition switch is in "on" position.

The photoelectric cell can be any suitable photoelectric cell, many of which are known. It should have a current output sufficient to operate relay 5 which in turn activates a switch controlling current which activates the warning signal lamps. If desired an amplifier can also be employed. Generally a photoelectric cell of low-sensitivity is satisfactory and should be selected to be responsive to the light source. One suitable photoelectric cell is Model 60–200 Electronic Safety Eye, manufactured by Midland International Corp., which includes a highly sensitive photo-conductive cell and lens system coupled with a very stable and dependable transistor relay-amplifier.

During operation of the vehicle at low speed, in reverse, or parked with ignition on, the light source activates the photoelectric cell which in turn operates relay 5 which closes a switch which in turn closes the circuit to the warning signal, e.g. the flashing lamp, or lamps 6, thereby causing it to operate. At a velocity above the pre-determined velocity, the mask interrupts the light beam to the photoelectric cell causing relay 5 to open the switch and to interrupt electrical current to the warning signal means, e.g. the flashing lamps, and the warning signal is off. When the velocity of the vehicle is reduced below the pre-determined velocity, the masking pointer swings away from in front of the light source whereby the photoelectric cell again operates the relay which closes the circuit and activates the warning signal. The pre-determined velocity is controllable by the position of the light source and photoelectric cell which in turn are controllable by the operator of the vehicle by rotating the handle attached thereto. The warning device can therefore become operative at a variety of speeds, i.e. it can be controlled to warn at speeds of 50–60 mph or less for high-speed express highway driving, or it can be set for 15–20 mph for slow traffic conditions.

An incandescent lamp, or multiple thereof, is a suitable warning signal means in the device of this invention and can be mounted in any desirable position on the vehicle. In its simplest embodiment, a single lamp mounted in the rear window of the vehicle will fulfill the principal object of this invention. Optionally the lamp can be a rotating lamp mounted on the top of the vehicle. Preferably, the warning device operates the turn signal lamps provided on the vehicle, of which there generally are four, as shown in the drawing. Preferably, but not necessarily, the device operates all four of the turn signals.

When two or more lamps, usually four lamps, are employed with a second flasher unit 14 which is installed on some vehicles as a stopped-vehicle warning, a diode 13 must be placed in the lead from the four-way flasher to each lamp to prevent back-feed. Switch 15 is a two-position, manually-operated switch normally supplied with the flasher unit. If the warning device is being installed during construction of the vehicle, switch 7 can be integrated with the turn signal switch so that when the turn signal lever is moved to "on" position the warning device is automatically switched out of the circuit. In this case a multiple-pole switch capable of opening the circuits to all of the warning lamps 6 and mechanically operated by the turn signal lever preferably is substituted for the diodes 13. When the device is being installed on an existing vehicle, a relay 8 is placed in the circuit to operate switch 7. The relay is connected, as shown in the drawing, through a diode 9 to the positive terminal of panelboard 10. The other terminal of the relay is connected to the negative terminal 11 of the flasher to which the turn signal switch, which operates the turn signal lamps, is connected. This flasher is hereafter referred to as the first flasher unit, of the type described in reissue U.S. Pat. No. 24,023. A capacitor 12 is connected across the terminals of the relay. The size of the capacitor is selected in accordance with the length of delay preferred. A suitable capacitor can be of 800 or 1000 microfarad, for example, providing a delay of several seconds after the turn signal lever returns to "off" position. It is understood that the invention is not to be limited to such size capacitors.

By means of the above circuit and accessories, the velocity warning signal is automatically interrupted when the turn signal lever is placed in "on" position. Placing the lever in the "on" position permits current to flow through relay 8 and flasher 11. The current flow through relay 8 opens switch 7, normally closed, thereby interrupting power to relay 5. After the turn has been completed and the turn signal lever returns to the "off" position current stops flowing through relay 8 and switch 7 returns to the normally closed position, so that power is restored to relay 5, and the warning device of this invention again becomes operable until the vehicle has gained sufficient velocity for the masking pointer to inactivate the system.

The relay 8 and switch 7 suitable for use in the present invention are known in the art and are commercially available, generally as a unit. The relay and capacitor should suitably match the electrical system of the vehicle, e.g. generally 12 volts. Relay 5 responsive to the photoelectric cell is selected to be operable by the current output of the cell. Matched units are available commercially and are suitable for the practice of this invention.

The diodes and capacitor are also commercially available and commercially available units are suitable for the practice of this invention.

It is understood that the warning device of this invention can be used to operate other signal means than lamps. It can, for instance, be used with a horn, siren, etc. with appropriate accessories. Such variations are deemed to be the equivalent of the device described herein in detail.

The device of the present invention can be adapted to any moving vehicle, either self-propelled or towed, but generally it will be most frequently employed with a self-propelled vehicle, including automobiles, buses, trucks, trailer-trucks, motorcycles, bicycles, motor boats and the like.

I claim:

1. An automatic warning device for a vehicle equipped with a warning signal means for warning that said vehicle is stopped, or is in reverse motion or is in motion at a velocity below a selected velocity, comprising
   a. a rigidly mounted speedometer responsive to said velocity and having a radially-movable pointer having a mask thereon in the same plane as that of said pointer adapted to mask a light source, said pointer projecting an arc as it moves radially responsive to said velocity of said vehicle,
   b. a light source pivotably-mounted behind said speedometer and adjustable along an arc generally concentric with said arc projected by said masking pointer and maskable by said masking pointer,
   c. a photoelectric cell concentrically and pivotably mounted forward of said speedometer, parallel to and responsive to and activated by said light source, and radially adjustable along said arc, said photoelectric cell being connected with a relay adapted to closing a circuit to and activating said warning signal means when said photoelectric cell is activated by said light source, and opening said circuit when said masking pointer moves in front of said light source at said selected velocity, thereby interrupting light from said light source whereby said photoelectric cell is inactivated, and thereby inactivating said warning signal means.

2. The velocity detecting means of claim 1 wherein a pointer-stop projects forwardly from said light source, said stop being adapted to prevent said pointer from moving radially beyond said light source.

* * * * *